United States Patent [19]

Haefner et al.

[11] Patent Number: 5,360,957
[45] Date of Patent: Nov. 1, 1994

[54] CONTROLLED APPARATUS FOR ELECTRICAL DISCHARGE MACHINING

[75] Inventors: Kenneth B. Haefner, Schenectady, N.Y.; James R. Bischoff, Wilmington, Mass.; Mark D. Ehresman, Haverhill, Mass.; Steven F. Comeau, No. Reading, Mass.

[73] Assignee: General Electric Company, Schenectady, N.Y.

[21] Appl. No.: 896,933

[22] Filed: Jun. 11, 1992

[51] Int. Cl.$^5$ .................... B23H 1/02; B23H 7/18; B23H 9/14

[52] U.S. Cl. ................. 219/69.16; 219/69.13; 219/69.17

[58] Field of Search ............... 219/69.13, 69.16, 69.18, 219/69.17, 69.2, 69.19; 204/129.2, 129.55, 224 M

[56] References Cited

U.S. PATENT DOCUMENTS

| | | | |
|---|---|---|---|
| 3,340,478 | 9/1967 | Poerschke | 219/69.16 |
| 3,381,107 | 4/1968 | Poerschke | 210/69.16 |
| 3,485,987 | 12/1969 | Porterfield | 219/69.13 |
| 3,562,476 | 2/1971 | Rupert | 219/69.16 |
| 3,737,615 | 6/1973 | Bell, Jr. | 219/69.13 |
| 3,806,691 | 4/1974 | Roach | 219/69.16 |
| 3,816,692 | 6/1974 | Ratmansky | 219/69.13 |
| 4,107,504 | 8/1978 | Dinsdale | 219/69.16 |
| 4,146,770 | 3/1979 | Dinsdale et al. | 219/69.13 |
| 4,229,635 | 10/1980 | Dinsdale | 219/69.16 |
| 4,258,243 | 3/1981 | Bell, Jr. et al. | 219/69.16 |
| 4,338,504 | 7/1982 | Gray | 219/69.16 |
| 4,348,573 | 9/1982 | El-Menshawy et al. | 219/69.13 |
| 4,484,051 | 11/1984 | Yamada et al. | 219/69.13 |
| 4,495,394 | 1/1985 | McGregor et al. | 219/69.13 |
| 4,687,563 | 8/1987 | Hayes | 204/224 M |
| 4,950,860 | 8/1990 | El-Menshawy | 219/69.18 |

FOREIGN PATENT DOCUMENTS

61-297016 12/1986 Japan ................ 219/69.16

OTHER PUBLICATIONS

Chapter 14, vol. 1 of Tool and Manufacturing Engineers Handbook titled "Electrical Discharge Machining (EDM)", T. J. Drozda, C. Wick, Society of Manufacturing Engineers-pp. 14-42-14-61, No Publication Date.
"Fast EDM Drilling", Peter Roy Durgan, Society of Manufacting Engineers, Dearborn, Michigan, pp. EE8-9-815-EE89-815-10, Dec. 1989.
"Multi-Small Hole Drilling by EDM", D. F. Toller, American Institute of Aeronautics and Astronautics, Dec. 1983.
"Study on Micro-Hole Drilling by EDM", Takahisa Masuzawa, Masatoshi Fujino, Kazuya Kobayashi and Takayuki Suzuki, Bull. Japan Soc, of Prec. Engg., vol. 20, No. 2 (Jun. 1986) pp. 117-120.
"High-Volume Hole Making with EDM"-R. L. Hatschek, American Machinist, Oct. 1983, pp. 85-87.
"The Performance of Single-Electrode Fine-Hole Drilling by Electro-Discharge Machining"-J. R. Crookall, M. I. Kamal-pp. 313-320, No Publication Date.
"The Development of an Electrodischarge Machine for Micro-hole Boring", T. Sato, T. Mizutani, K. Yonemochi and K. Kawata, Jul. 1986, vol. 8, No. 3, pp. 163-168.
"Small Hole Drilling in EDM", M. L. Jeswani, Int. J. Machine Tool Des. Res, vol. 19, pp. 165-169.

*Primary Examiner*—Geoffrey S. Evans
*Attorney, Agent, or Firm*—Marvin Snyder

[57] ABSTRACT

A controlled EDM apparatus comprises at least one electrode mounted in a base, a driver for positioning the base, a system for providing electrical energy to the electrode, a monitor for measuring the electrical discharge frequency of the electrode, and a controller responsive to the monitor for controlling either the driver or the energy providing system. The apparatus operates by measuring the electrical discharge frequency of the electrode and controlling at least the duration of machining in accordance with the frequency measured.

38 Claims, 6 Drawing Sheets

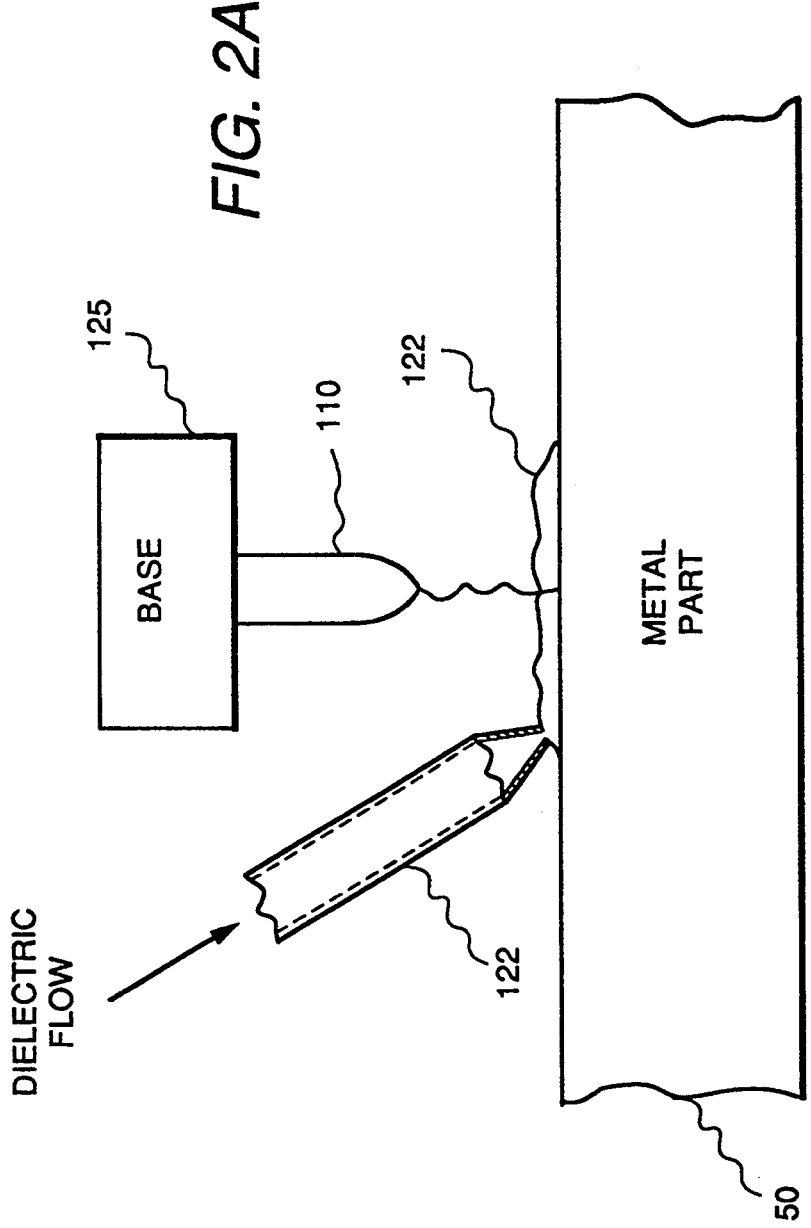

CONTROLLED APPARATUS FOR ELECTRICAL DISCHARGE MACHINING

FIELD OF THE INVENTION

The invention relates to a controlled apparatus for electrical discharge machining. More particularly, the invention relates to closed loop feedback control of such an apparatus.

BACKGROUND OF THE INVENTION

Electrical discharge machining (EDM) is a well-known process for machining an electrically conductive workpiece or part sometimes performed by a numerically controlled device. EDM is described in Chapter 14, Volume 1 of *Tool and Manufacturing Engineers Handbook* (1983), by Thomas J. Drozda and Charles Wick, published by the Society of Manufacturing Engineers (SME) and herein incorporated by reference. Other features of EDM are described in "Fast EDM Drilling," by Peter Roy Durgan, a technical paper published in 1989 by the SME, "Multi-Small Hole Drilling by EDM," by D. F. Troller, a technical paper published in 1983 by the American Institute of Aeronautics and Astronautics, "Small Hole Drilling in EDM," by M. L. Jeswani, published in *the International Journal of Machine Tool Design*, Volume 19, pp. 165-169 in 1979; "Study on Micro-Hole Drilling by EDM," by T. Masuzawa, M. Fujino, K. Kobayashi, and T. Suzuki, published in *the Bulletin of the Japanese Society of Precision Engineering*, Volume 20, No. 2, in June 1986; "High-Volume Hole Making with EDM," by R. L. Hatschek, published in *American Machinist* in October, 1983; "The Performance of Single-Electrode Fine-Hole Drilling by Electro-Discharge Machining," by J. R. Crockall and M. I. Kamal, published in 1976 in the Proceedings of the 17th Annual Machine Tool Design and Research Conference; and "The Development of an Electrodischarge Machine for Micro-Hole Boring," by T. Sato, T. Mizutani, K. Yonemochi, and K. Kawata, published in *Precision Engineering*, Volume 8, No. 3, in July 1986, all of which are herein incorporated by reference.

Specifically, as described in the Hatschek article, such machining includes forming at least one and frequently a large number of cooling holes or apertures in combustor liners for aircraft jet engines. During EDM, holes are formed by vaporizing a small portion of electrically conductive material, such as metal, with an electrical discharge. An EDM apparatus typically includes one or more electrodes for conducting electrical discharges between the apparatus and the part.

The EDM process described above has several problems. First, as a result of the electrical discharges, the electrodes of the EDM apparatus erode to a bullet shaped tip that requires drilling a predetermined distance beyond the thickness of the part to obtain a through hole of proper size and shape. Second, beyond the combustor liner wall is another wall, called a plenum wall, that due to various process anomalies or errors may be machined or drilled by the electrodes unintentionally. Drilling of the plenum or other back wall is referred to as "scarfing." Such damage to the part or workpiece may entail costly repair procedures or result in the scrapping of valuable hardware. A third problem relates to regulation of the feedrate of the electrodes. If the electrodes are too far from the part, no electrical discharge will take place Likewise, if the electrodes are too close or even touch the part no discharge occurs due to an electrical short. Thus, to perform EDM the electrodes must stand off a predetermined distance from the metal part. In this context, the shortest distance between the electrode and the part when the electrode is positioned in a particular location adjacent the part constitutes the standoff distance.

U.S. Pat. No. 4,495,394, "Electronic Depth Controller for EDM Apparatus," by McGregor et al., issued Jan. 22, 1985, assigned to Raycon Corporation and herein incorporated by reference, discloses an electronic depth controller for an EDM apparatus based upon the output of a position transducer. Although this type of control may reduce the amount of scarfing, it does not detect the onset of scarfing. A need thus exists for a real-time closed loop feedback control system to detect the onset of scarfing.

SUMMARY OF THE INVENTION

One object of the invention is to provide an EDM apparatus and method for detecting the onset of scarfing.

Another object is to provide an EDM apparatus and method in which electrode depth relative to the workpiece is provided in real time.

Still another object is to provide an EDM apparatus and method in which the electrode feedrate is regulated in real time to improve drilling performance.

In accordance with the invention, an apparatus for electrical discharge machining an electrically conductive part comprises at least one electrode mounted in a base, a driver for positioning the base relative to the part, a system for providing electrical energy to the electrode to produce a plurality of electrical discharges between the electrode and the part when the electrode is positioned adjacent the part, an electrical discharge frequency monitor for measuring the frequency of the electrical discharges, and a controller, responsive to the discharge frequency monitor, for controlling either the energy providing system or the driver.

BRIEF DESCRIPTION OF THE DRAWINGS

The subject matter regarded as the invention is particularly pointed out and distinctly claimed in the concluding portion of the specification. The invention, however, both as to organization and method of operation, together with further objects and advantages thereof, may be best be understood by reference to the following detailed description when read with the accompanying drawings in which:

FIG. 2A is a schematic diagram of a portion of another embodiment of the invention.

DETAILED DESCRIPTION OF THE INVENTION

Figure 1:
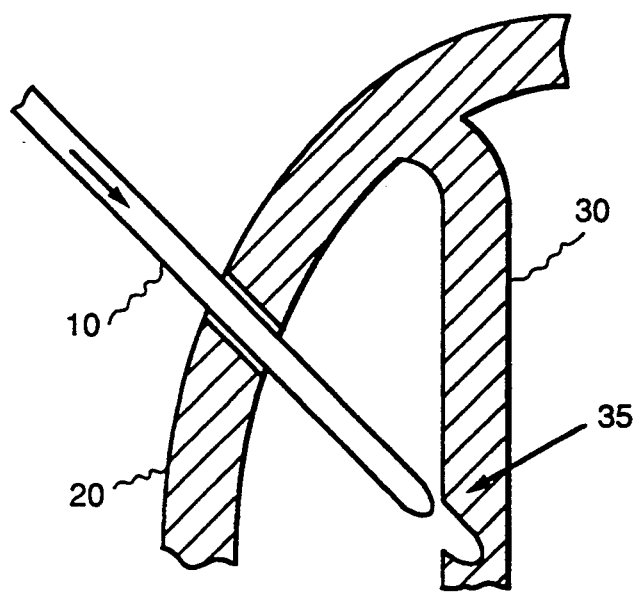
FIG. 1 is a fragmentary illustration of a typical geometric arrangement of an EDM apparatus electrode relative to a metal workpiece.

FIG. 1 illustrates a typical EDM geometry relative to the workpiece, including an electrode 10, a combustor chamber wall 20, and a plenum wall 30. An EDM apparatus typically has the capability to advance electrode 10 towards the electrically conductive or metal workpiece or part, in this case combustor chamber wall 20. The rate of advance towards wall 20 (in the direction of the arrow), termed the electrode feedrate, may be regulated to maintain a predetermined standoff distance between the electrode and the part so that when the electrode is energized a plurality of electrical discharges between the electrode and the part performs the machining. Electrode 10 typically is eroded to a bullet shaped tip through continued machining use. Thus, to form a through hole of sufficient size and shape the electrode must pass through and extend beyond the chamber wall thickness, as indicated in FIG. 1. Through process errors or anomalies, the electrode may extend enough beyond chamber wall 20 to begin drilling plenum wall 30 resulting in scarfing, as indicated by numerals 35 in FIG. 1.

Figure 2:
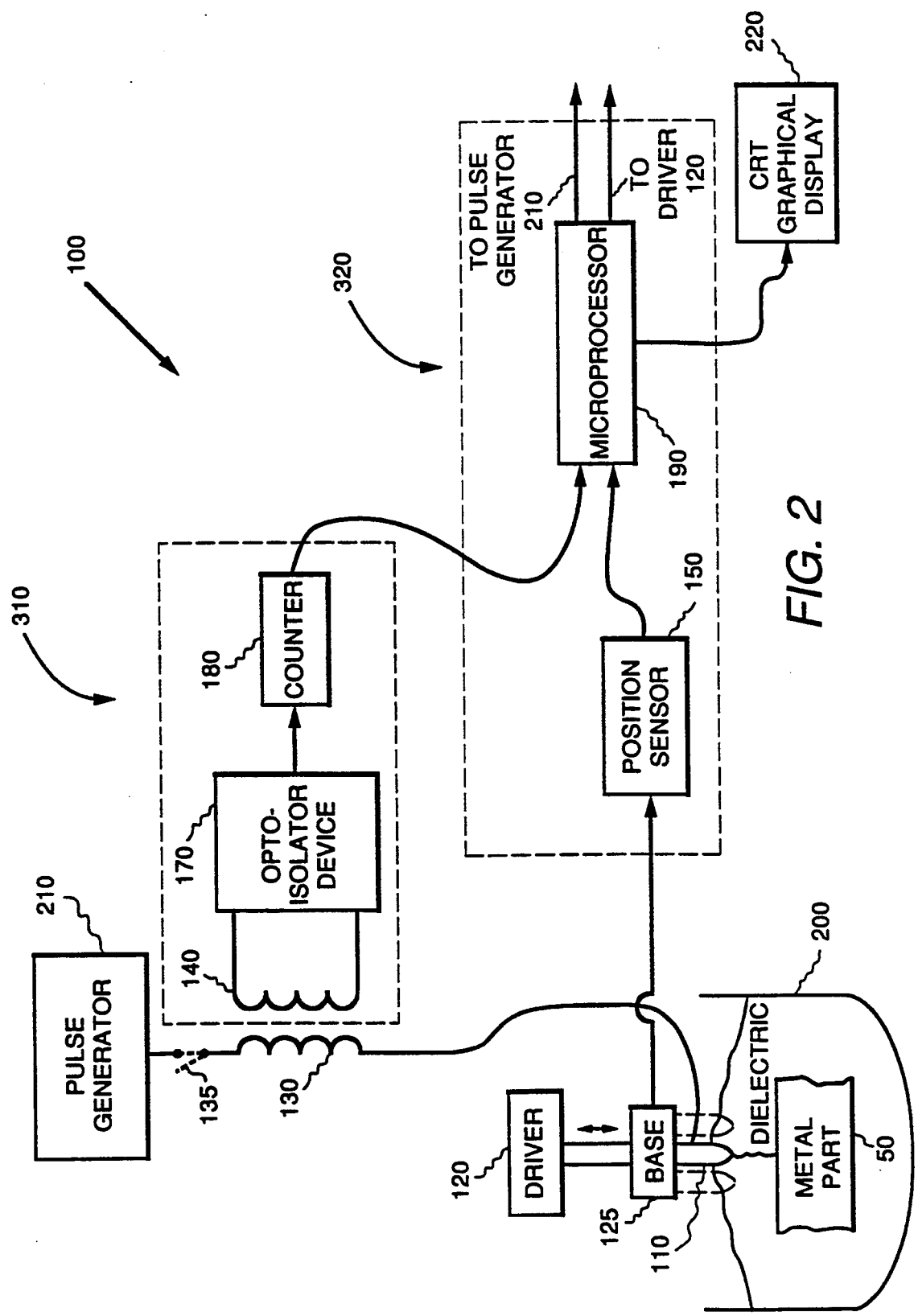
FIG. 2 is a schematic diagram of an embodiment of the invention.

FIG. 2 illustrates an apparatus 100 for machining a metal part by electrical discharge. The illustrated apparatus includes at least one electrode 110 mounted in a base 125, although typically the apparatus includes a plurality of electrodes. The apparatus further includes a driver 120 for positioning the base relative to the part, a system for providing energy to the electrodes to produce a plurality of electrical discharges between the electrodes and the metal part when the electrodes are positioned adjacent the part, an electrical discharge frequency monitor 310 for measuring the frequency of electrical discharges for each electrode, and a controller 320, responsive to the electrical discharge frequency monitor, for controlling either driver 120 or the energy providing system. The illustrated EDM apparatus shown in FIG. 2A; includes a dispenser 121 or other device for providing liquid dielectric 122 to the surface of the metal part 50 to facilitate electrical discharging. The arrow illustrates direction of flow of the liquid dielectric through dispenser 121. FIG. 2 illustrates a metal part 50 immersed in a container 200 of liquid dielectric, such as water or dielectric oil Texaco 499. A fluid dielectric, such as a liquid, provides a medium in which the electrical discharges may occur and may further assist in removing particulate from the part surface during the EDM process.

The configuration of the energy providing system, the electrical discharge frequency monitor, and the controller may depend upon the particular EDM apparatus. FIG. 2 illustrates the energy providing system as including a pulse generator 210 coupled to a primary induction coil 130, such as in a transformer, in series with electrode 110. In a configuration such as illustrated in FIG. 2 where the apparatus may comprise a plurality of electrically isolated electrodes, the apparatus may also include a plurality of primary induction coils, each respective coil being coupled in series with a separate respective electrode. It will be appreciated that the energy providing system need not include a power source or pulse generator; instead, it may include a switch 135 (shown in phantom in FIG. 2) or other device for electrically coupling the energy providing system to an external power source or generator. It will be likewise appreciated that a driver may position the part relative to the electrodes instead of positioning the base relative to the part.

Electrical discharge frequency monitor 310 includes a secondary coil 140 inductively coupled to primary coil 130. Secondary coil 140 is electrically coupled to a conventional opto-isolator device 170, such as a light emitting diode (LED) optically coupled to a phototransistor. Likewise, where the apparatus includes a plurality of electrodes, the apparatus may include a plurality of secondary coils and a plurality of opto-isolator devices, each respective secondary coil and opto-isolator device coupled to a separate respective electrode. Opto-isolator device 170 provides a digital output signal for each electrical discharge occurring between electrode 110 and the metal part.

In operation, an electrical discharge between electrode 110 and metal part 50 is detected by a current surge through primary coil 130 associated with a change in voltage of electrode 110. Inductive coupling between primary coil 130 and secondary coil 140 produces a voltage signal in coil 140 which is provided to opto-isolator device 170. Device 170 likewise provides a corresponding digital output signal to counter 180 which counts the number of digital output pulses to ascertain an electrical discharge frequency. In the embodiment in which apparatus 100 includes a plurality of electrodes, the apparatus may also include a plurality of gated counters, one counter for each electrode. The invention is not limited in scope to this particular electrical discharge frequency monitor since other devices or techniques may alternatively be employed for measuring or monitoring electrical discharge frequency depending, in part, upon the particular EDM apparatus. For example, a resistor may be coupled in series with an electrode to convert any current surges into a voltage signal. Likewise, conventional techniques available for monitoring the gap voltage between an electrode and the part may be employed to monitor electrical discharge frequency. Furthermore, as will be appreciated by those skilled in the art, techniques other than inductive coupling are available to monitor current.

Controller 320 may be implemented with various devices. In the embodiment illustrated in FIG. 2, the controller includes a position sensor or transducer 150 for converting the translational motion of base 125 into one or more electrical signals although a position sensor or transducer is not required for successful operation. Controller 320 also includes a microprocessor 190 responsive to the electrical discharge frequency monitor 310. Microprocessor 190 may also include an internal clock (not shown). As illustrated in FIG. 2, microprocessor 190 receives an electrical discharge frequency signal from counter 180 and a base position signal from sensor 150. Sensor 150 may likewise provide an electrode position signal or, alternatively, microprocessor 190 may include programming to calculate electrode position from the base position signal.

A number of other possible embodiments exist for controller 320 and the invention is not limited to any particular embodiment. For example, controller 320 may comprise a closed loop feedback control system including a microcontroller, an application specific integrated circuit (ASIC), a digital signal processor (DSP), or another type of processor. The microprocessor or other processor may incorporate a closed loop feedback control algorithm based upon electrical discharge frequency, base position, or other signals useful for monitoring or controlling an EDM apparatus.

In the embodiment illustrated in FIG. 2, microprocessor 190 incorporates a closed loop feedback control algorithm for either controlling driver 120 or the energy providing system based upon signals provided by counter 180 and sensor 150. For example, microprocessor 190 provides either a signal to cease electrical discharge machining, such as a signal to generator 210 or to a switch coupling a generator or other power source to the electrodes, or alternatively provides a signal to driver 120 to retract base 125 away from the part. A closed loop feedback control algorithm may provide periodic, or discrete-time, closed loop feedback control for the EDM apparatus or it may provide continuous closed loop feedback control. In periodic feedback control operation, the closed loop feedback control system may incorporate, in real-time, sequences of measurements, such as several measurements per second, provided by the electrical discharge frequency monitor, sensor 150, other EDM apparatus components, or any combination thereof. Alternatively, the closed loop feedback control algorithm may provide continuous closed loop feedback control of the EDM apparatus. It will be appreciated that digital signals may be converted to analog signals by a conventional analog-to-digital converter. When using a closed loop feedback control algorithm to provide continuous closed loop feedback control, the controller continuously receives signals from sensor 150, the electrical discharge frequency monitor, or other EDM apparatus components and based upon that information determines the appropriate time to cease EDM or to retract the base. Likewise, a continuous or periodic closed loop feed control algorithm may regulate the electrical energy provided to an electrode or control the position of the base, such as described hereinafter.

In yet another embodiment, controller 320 may comprise a closed loop feedback control system including electrical circuitry, such as a counter, digital clock, or other discrete electrical or electronic components. The electrical circuitry may incorporate both analog and digital components. It will be appreciated by those skilled in the art that many possible electrical circuits may be designed and constructed to implement various closed loop feedback control systems. A host of factors, including the particular EDM apparatus, will affect the determination of the particular closed loop feedback control system to be realized by the electrical circuitry.

An EDM apparatus in accordance with the invention may also include a graphical or other display, such as CRT graphical display 220 illustrated in FIG. 2, to monitor signals provided by any of the components of the EDM apparatus previously described, such as the primary or secondary coils, the opto-isolator device, the counter, the position sensor, the microprocessor, or any combination thereof. In the embodiment illustrated in FIG. 2, graphical display 220 monitors signals provided by microprocessor 190. Such a graphical or other display may provide diagnostic information to a machine operator to ascertain that each electrode is performing properly, or to fulfill some other diagnostic purpose.

Figure 3:
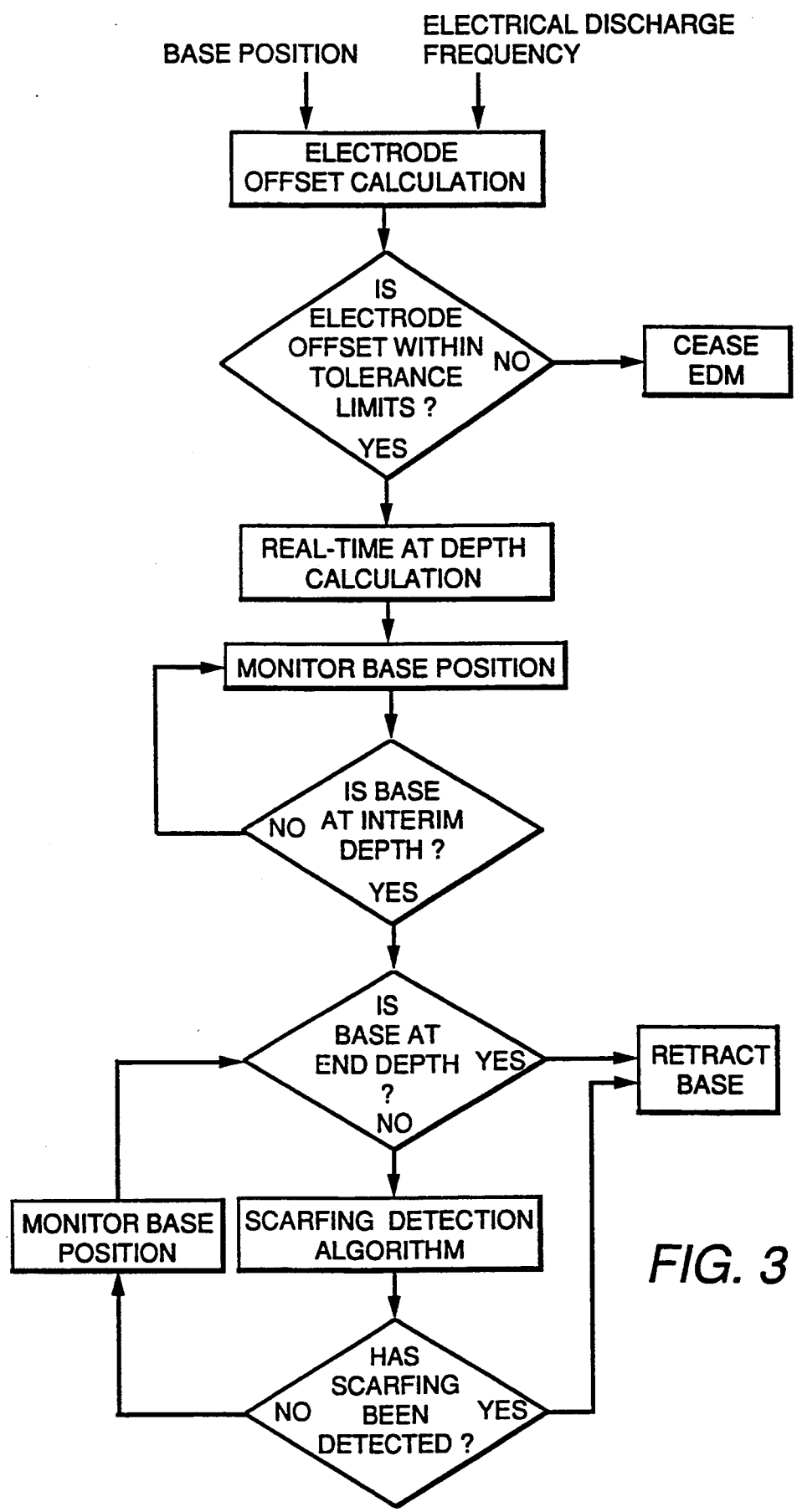
FIG. 3 is a flow chart illustrating operation of one embodiment of the invention.

FIG. 3 is a flow chart of one embodiment of a closed loop feedback control algorithm to be executed by microprocessor 190 of FIG. 2. After the beginning of the electrical discharge machining, microprocessor 190 performs an electrode offset calculation based upon a position signal provided by sensor 150 and an electrical discharge frequency signal provided by counter 180. This calculation requires an EDM apparatus including at least two electrodes. After the calculation, microprocessor 190 determines whether the electrode offset is within predetermined tolerance limits. If the offset is not within these tolerance limits, the microprocessor provides a signal to a pulse generator, switch, oscillator, or other switch driver to terminate the electrical discharges. If the offset is within the tolerance limits, microprocessor 190 performs an "at depth" calculation in real time to determine when to retract base 125 away from the metal part. As driver 120 continues to advance base 125 towards the metal part, sensor 150 monitors the location of the base, and, hence, the location of the electrodes relative to the metal part. Microprocessor 190 continually receives the base position signal from sensor 150 until the base is advanced to a predetermined interim depth. Then microprocessor 190 of FIG. 2 continually executes a closed loop to determine when to signal driver 120 to retract base 125 away from the part. In this closed loop, microprocessor 190 determines, based upon signals from sensor 150, whether the base has achieved the desired end depth derived from the real-time at depth calculation. If so, microprocessor 190 provides a signal to driver 120 to retract base 125 away from the part. If not, the microprocessor executes a scarfing detection algorithm to ensure that no scarfing has occurred although the base, and hence, the electrodes have not yet achieved the desired depth. It will be appreciated that, in contrast with the electrode offset calculation, only one electrode is required to detect the onset of scarfing. If scarfing is detected, microprocessor 190 likewise provides a signal to driver 120 to retract base 125 away from the part. If scarfing is not detected, microprocessor 190 continues to monitor the position of the base or the electrodes relative to the part by signals from sensor 150. Eventually, the base, and likewise, the electrodes reach the desired depth or scarfing is detected. Base 125 is retracted in either case.

Figure 4:
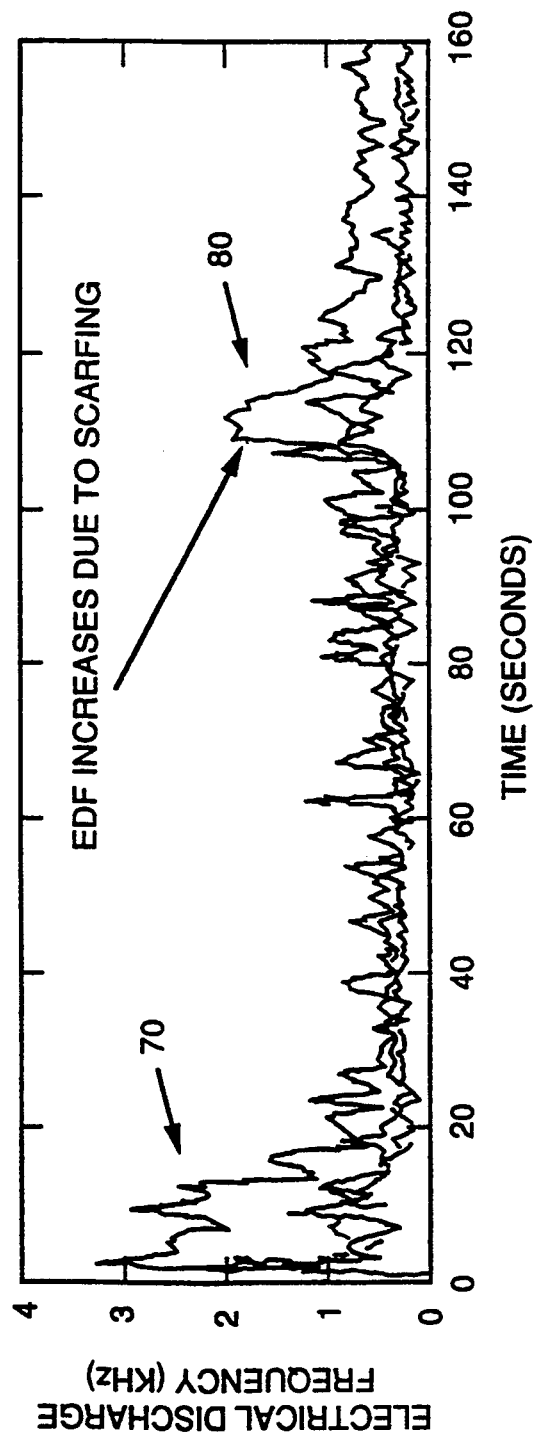
FIG. 4 is a plot of the electrical discharge frequency versus time during operation of the embodiment of the invention illustrated in FIG. 2.

FIG. 4 is a plot of electrical discharge frequency versus time during operation of apparatus 100 of FIG. 2 for a plurality of electrically isolated electrodes. The increases or rises in electrical discharge frequency shown in FIG. 4 illustrate an aspect of the scarfing detection algorithm and the electrode offset calculation described above. FIG. 4 depicts an initial rise or a spike 70 in the electrode discharge frequency as the plurality of electrodes begins to machine the metal part. This indicates the start or initiation of electrode drilling or machining. Likewise, a second rise or spike 80 in electrical discharge frequency is illustrated as the electrodes begin to machine the plenum wall, such as wall 30 in FIG. 1. The plot shows a frequency approaching 2 kilohertz when the electrodes begin to machine wall 30. This second rise is similar to the initial rise. In the embodiment illustrated in FIG. 2 microprocessor 190 monitors the electrical discharge frequency and provides a signal to driver 120 to retract base 125 away from the metal part when the electrical discharge frequency exceeds a specified value. It will be appreciated that this predetermined value may vary depending upon the size, shape and composition of the particular electrode, as well as other factors. For the embodiment illustrated in FIG. 2, as depicted in the plot of FIG. 4, the second rise in electrical discharge frequency occurs in less than 2 seconds, permitting retraction of base 125 before a significant amount of scarfing has taken place. Test results indicate that less than 2 mils of scarfing may occur before base retraction.

The spikes or rises in the electrode discharge frequency also affect the electrode offset calculation and the real time at depth calculation performed by the algorithm illustrated in FIG. 3. As described, discharge frequency monitor 310 of FIG. 2 measures the electrical discharge frequency of each separate electrode. These signals are provided to controller 320 along with the signal from sensor 150 representing the position of base 125. Thus, for a particular embodiment, controller 320 may store the position of the base as the electrical discharge frequency of each separate electrode exceeds a specified frequency. Thus, for an EDM apparatus including a plurality of electrodes, controller 320 may determine the amount of electrode offset between the first electrode to begin machining combustor wall 20 and the last electrode to begin machining combustor wall 20. This difference provides a measurement of the electrode offset to determine whether the offset is within tolerance limits, as indicated in the flow chart of FIG. 3. Yet another feature for a closed loop feedback control algorithm employing electrical discharge frequency measurements includes a signal to cease EDM or to retract the base if not all electrodes are performing EDM after the base position exceeds the predetermined electrode offset tolerance.

Once the electrode offset is determined, as indicated above, the offset amount may be used to perform the real time at depth calculation, also illustrated in FIG. 3. This calculation is performed by controller 320 of FIG. 2 to determine the end depth for retracting the base to avoid scarfing while at the same time performing overdrilling, i.e. drilling beyond wall 20 to ensure forming a through hole of proper size and shape. Thus, in this embodiment, the real time at depth calculation includes summing the electrode offset, the thickness of wall 20, and the electrode overdrilling requirement. Thus, when the base reaches this depth, the last electrode to drill wall 20 should have completely formed a through hole in which the overdrilling requirement should have been achieved to ensure the hole is of proper shape and size. Likewise, the electrode offset may be used to determine the interim depth specified in FIG. 3. In this particular embodiment, the interim depth is the sum of the electrode offset and the wall thickness. As illustrated in FIG. 3, once the at depth calculation is performed the position of the base is continually monitored so that the EDM apparatus may be retracted when this end depth is achieved. It will be appreciated by those skilled in the art that this closed loop feedback control algorithm may likewise be used to drill or machine blind holes, instead of through holes, to a predetermined depth in the part.

Figure 5:
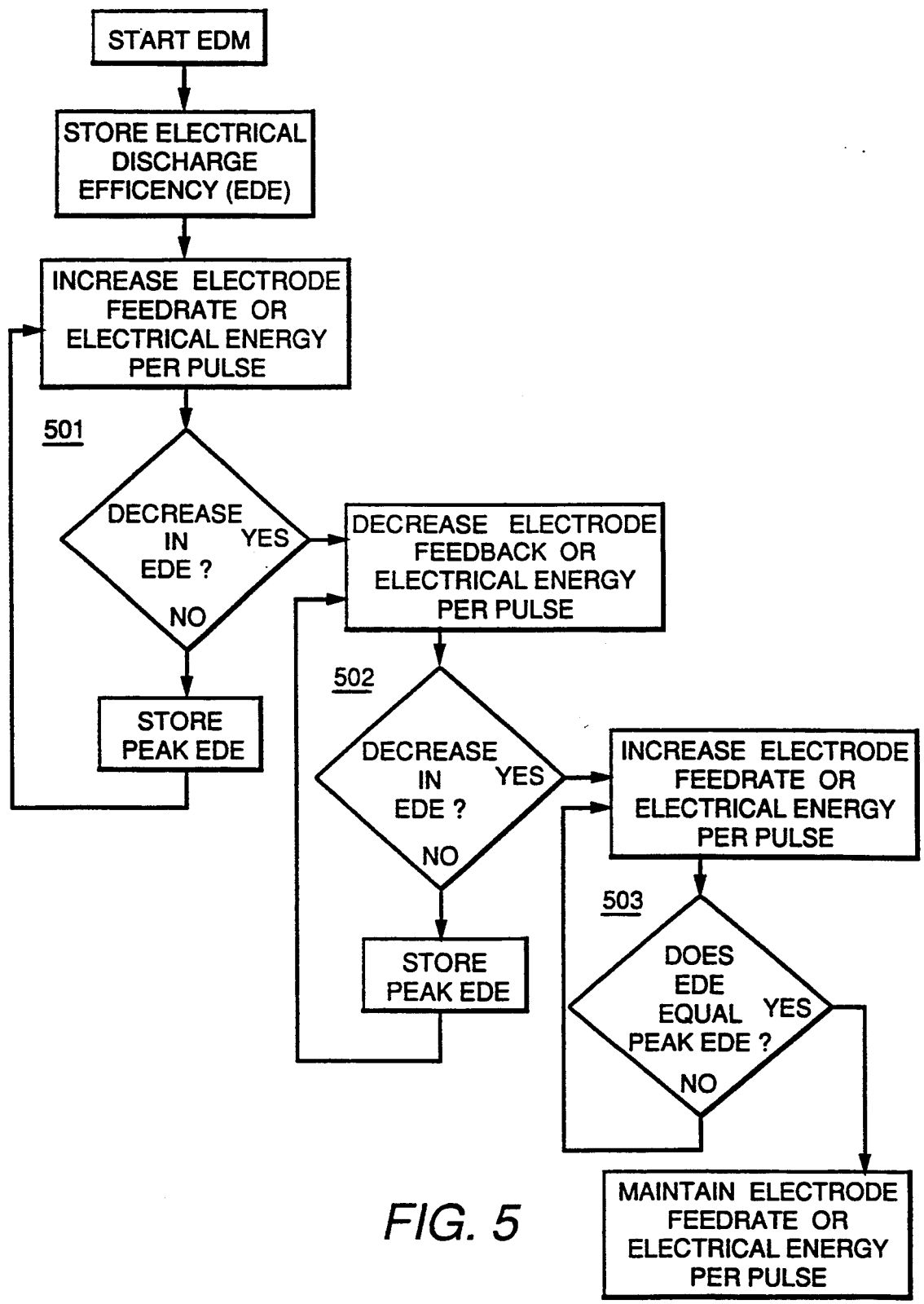
FIG. 5 is a flow chart illustrating operation of an alternative embodiment of the invention.

FIG. 5 is a flow chart illustrating operation of an alternative embodiment of the invention. In this embodiment controller 320 of FIG. 2 employs signals from electrical discharge frequency monitor 310 to control either the electrode feedrate or the electrical energy provided to improve drilling performance. As previously described, a predetermined standoff distance should be maintained between an electrode and the part, such as wall 20, to perform electrical discharge machining. If the electrode is too far from the part no electrical discharge will take place. Likewise, if the electrode is too close to the metal part no discharge will occur. Similarly, the amount of electrical energy provided per pulse may affect drilling performance. If too little energy is provided, no discharge may occur; however, if too much energy is provided, a number of problems affecting drilling performance may occur, such as poor machining or even the inability to establish a series of discrete electrical discharges. As a predetermined electrode feedrate is maintained, the energy of a pulse may be adjusted, such as by modifying its pulse width or its amplitude. By monitoring and comparing the power surges or pulses provided to coil 130 and the electrical discharges as either standoff distance or electrical energy per pulse is adjusted, the drilling performance of the electrodes may be improved. In fact, monitoring the electrical discharge frequency and the power pulse or surge frequency facilitates use of a technique for directly assessing drilling performance because more electrical discharges during a series of power pulses results in improved drilling.

In one such alternative embodiment, coil 130 may receive a steady series of power surges or pulses from the generator. The feedrate of the electrodes may be increased or decreased in response to the measured electrical discharge frequency to control standoff distance. To adjust the electrode feedrate, microprocessor 190 provides a signal to driver 120 regulating the rate of advance towards the metal part. The electrode feedrate may be monitored by a variety of techniques, such as comparing position signals from sensor 150 with the output of a clock internal to microprocessor 190. Alternatively, instead of adjusting the electrode feedrate, the electrical energy per pulse may be adjusted as a predetermined electrode feedrate is maintained. Microprocessor 190 may, in this instance, provide a signal to generator 210 in FIG. 2, or another switch or switch driver, to modify the pulse width or pulse amplitude.

As indicated in FIG. 5, when electrical discharge machining has begun, an electrical discharge frequency (EDF) is provided to microprocessor 190. In an embodiment in which the power surge or pulse frequency is likewise monitored and compared with the EDF, electrical discharge efficiency (EDE) may be calculated and monitored. One example of an EDE is a ratio of the electrical discharge frequency (EDF) to the power pulse or surge frequency (PF), although other ways of determining or measuring EDE may alternatively be employed. In the embodiment illustrated in FIG. 2, the power pulses are provided at regular intervals so that monitoring the EDF alone is sufficient. FIG. 5 makes reference to EDE; however, as will be appreciated by those skilled in the art, EDE and EDF are essentially equivalent for the embodiment illustrated in FIG. 2. In response to a predetermined electrical discharge frequency microprocessor 190 of FIG. 2 provides either a signal to driver 120 resulting in an increase in the electrode feedrate, or a signal to generator 210 or other energy providing system resulting in an increase in electrical energy per pulse. Once the electrode feedrate or energy per pulse has been increased, the electrical discharge frequency is measured as previously described. This measured frequency is provided to microprocessor 190 which determines whether it has decreased. If the frequency has not decreased, the electrical discharge frequency is stored and microprocessor 190 again provides either a signal to driver 120 so that the electrode feedrate is again increased or a signal to generator 210 so that electrical energy per pulse is again increased. FIG. 5 includes a closed loop 501 in which the electrode feedrate or electrical energy per pulse is increased until the electrical discharge frequency decreases. However, during this closed loop the peak electrical discharge frequency is stored. Once the electrical discharge frequency has begun to decrease, as indicated in FIG. 5, the electrode feedrate or electrical energy per pulse is decreased. Again, a closed loop 502 monitors electrical discharge frequency as the electrode feedrate or electrical energy per pulse is decreased. The electrode feedrate or electrical energy per pulse is decreased until the electrical discharge frequency begins to decrease. During this closed loop the peak electrical discharge frequency is again stored. Once the electrical discharge frequency begins to decrease the electrode feedrate or electrical energy per pulse is again increased, however, in this third, and final closed loop 503 the electrical discharge frequency is increased until it reaches the peak electrical discharge frequency stored in either of the two previous closed loops. At this point, the peak electrical discharge frequency is achieved and the electrode feedrate is neither increased nor decreased to maintain the corresponding standoff distance or, alternatively, the electrical energy per pulse is maintained, as the case may be.

In still another embodiment of the invention, both electrode feedrate and electrical energy per pulse may be regulated or adjusted to improved drilling performance. For example, the electrode feedrate may be adjusted as previously described to obtain a peak EDF or EDE. Once this feedrate is obtained, the energy per pulse may be regulated as previously described to obtain a peak EDF or EDE at the previously determined electrode feedrate. Likewise, this process may be iterated, alternating between adjusting electrode feedrate and energy per pulse until the EDF or EDE improvement over the last interation is smaller than a predetermined amount. It will be also appreciated that if the starting electrode feedrate or electrical energy per pulse is known to fall on either side of the peak EDF or EDE, one of the first two closed loops illustrated in FIG. 5, 501 or 502, may be omitted. Furthermore, in embodiments of the invention including a plurality of electrodes, the EDF or EDE may be measured based on any particular electrode or any combination of electrodes.

The origin of the increase in electrical discharge frequency illustrated in FIG. 4 is not precisely known. It is speculated, however, that an increase or peak in electrical discharge frequency occurs as an electrode initially approaches the vicinity adjacent the part in which discharging occurs; however, as the machining or drilling continues, particulate matter may form in the hole due to machining and interfere with the electrical discharging, thus, reducing the electrical discharge frequency. The flow of liquid dielectric may also remove less particulate matter from the newly machined surface of the part and affect EDF.

An apparatus for electrical discharge machining in accordance with the invention may be operated according to the following method. Referring now to FIG. 2, base 125 is positioned relative to a workpiece or electrically conductive part. Electrode 110 is energized by a pulse generator or other system for providing electrical energy to produce a plurality of electrical discharges between the electrode and the part when the electrode is positioned adjacent the part. The frequency of the electrical discharges may be measured as previously described by secondary coil 140 digitally coupled to counter 180 through opto-isolator device 170 or another analog-to-digital conversion device. Sensor 150 monitors the position of base 125 as the base is advanced by driver 120. Microprocessor 190 controls or regulates either the position of base 125 or alternatively the electrical energy provided to electrode 110 or both, in accordance with the electrical discharge frequency measured. As previously described, the step of controlling or regulating either the position of the base or the energy provided to the electrode may include measuring the electrode position offset, performing a real-time at depth calculation, or monitoring the position of the base. Furthermore, controlling the position of the base may comprise advancing the base towards the part or retracting the base away from the part.

An alternative embodiment of a method for machining a metal part with an EDM apparatus comprising at least one electrode mounted in the base includes advancing base 125 towards the metal part at a predetermined rate, energizing electrode 110 to produce a plurality of electrical discharges between the electrode and the part when the electrode is positioned adjacent the part, measuring the frequency of the electrical discharges, and controlling or regulating either the rate of advance of base 125 or the electrical energy provided per pulse, or both in accordance with the electrical discharge frequency measured, as previously described. Likewise, as previously described, the EDM apparatus may include a plurality of electrodes and a method for machining a metal part with an EDM apparatus may include energizing those electrodes to produce electrical discharges between the electrodes and the part, measuring the electrical discharge frequency of each of the electrodes, and controlling or regulating either the position of the base or the energy provided to those electrodes, or both in accordance with the electrical discharge frequency measured for each of those electrodes.

The invention has been described in detail herein in accordance with certain preferred embodiments thereof, many modifications, substitutions, changes, and equivalents will now occur to those skilled in the art. For example, the present invention may have uses in types of machining other than hole drilling. One such use includes wire cutting or other types of cutting using an EDM apparatus. It is intended to cover all such modifications and changes as are within the true spirit and scope of the invention by means of the appended claims.

What is claimed is:

1. An apparatus for machining an electrically conductive part by electrical discharge comprising:
   at least one electrode mounted in a base;
   a driver for positioning said base relative to said part;
   means for providing electrical energy to said at least one electrode to produce a plurality of electrical discharges between said electrode and said part when said electrode is positioned adjacent said part;
   an electrical discharge frequency monitor for measuring rises in the frequency of said electrical discharges; and
   a controller coupled to said energy providing means and responsive to said discharge monitor, for controlling said energy providing means.

2. The apparatus of claim 1, wherein said controller is also coupled to said driver so that said controller has the capability to control said driver.

3. The apparatus of claim 2, wherein said energy providing means includes a switch electrically coupled to said at least one electrode.

4. The apparatus of claim 2, wherein said energy providing means includes a voltage pulse generator electrically coupled to said at least one electrode.

5. An apparatus for machining an electrically conductive part by electrical discharge comprising:
- at least one electrode mounted in a base;
- a driver for advancing and retracting said base relative to said part;
- means for providing electrical energy to said at least one electrode to produce a plurality of electrical discharges between said electrode and said part when said electrode is positioned adjacent said part;
- an electrical discharge frequency monitor for measuring rises in the frequency of said electrical discharges; and
- a controller coupled to said driver and responsive to said discharge monitor, for controlling said driver so as to retract said base relative to said part when the measured frequency of said electrical discharges rises above a predetermined value for a second time after said electrical discharges have been initiated.

6. The apparatus of claim 5, and further comprising means for providing liquid dielectric to the surface of said electrically conductive part.

7. The apparatus of claim 6, wherein said liquid dielectric providing means comprises a dispenser.

8. The apparatus of claim 5, and further comprising at least one more electrode mounted in said base; wherein said energy providing means comprises means for producing electrical discharges between said electrodes and said part; and said discharge monitor comprises means for measuring rises in the electrical discharge frequency of each of said electrodes.

9. The apparatus of claim 8, wherein said discharge monitor also has the capability to measure the electrical discharge frequency of each of said electrodes, said controller comprising a closed loop feedback control system including a microprocessor incorporating a closed loop feedback control algorithm for regulating the rate at which said base advances in accordance with the electrical discharge frequency measured for each of said electrodes.

10. The apparatus of claim 8, wherein said driver comprises means for advancing and retracting said base along an axis oriented substantially perpendicular to said part.

11. The apparatus of claim 8, wherein said driver comprises means for advancing and retracting said base along an axis oriented at an acute angle relative to said part.

12. The apparatus of claim 8, wherein said discharge monitor comprises digital electronic circuitry coupled to each of said electrodes.

13. The apparatus of claim 8, wherein said energy providing means comprises a plurality of primary coils coupled to a voltage pulse generator, each respective one of said primary coils being coupled to a separate respective electrode;
- said discharge monitor comprising digital electronic circuitry coupled to a plurality of secondary coils, each respective one of said secondary coils being inductively coupled to a separate respective one of said primary coils.

14. The apparatus of claim 13, wherein said digital electronic circuitry comprises a plurality of counters; each of said secondary coils being digitally coupled to a separate one of said counters.

15. The apparatus of claim 8, wherein said controller includes a sensor for monitoring the position of said base.

16. An apparatus for machining an electrically conductive part by electrical discharge comprising:
- at least two electrodes mounted in a base;
- a driver for positioning said base relative to said part:
- means for providing electrical energy to said electrodes to produce a plurality of electrical discharges between said electrodes and said part when said electrodes are positioned adjacent said part;
- an electrical discharge frequency monitor for measuring rises in the electrical discharge frequency of each of said electrodes, said discharge monitor also having the capability to measure the electrical discharge frequency of each of said electrodes; and
- a controller coupled to said driver and including a sensor for monitoring the position of said base, said controller being responsive to said discharge monitor for controlling said driver and comprising a closed loop feedback control system including a microprocessor incorporating a closed loop feedback control algorithm for controlling said driver to advance and retract said base and regulating the energy provided by said energy providing means in accordance with the electrical discharge frequency measured for each of said electrodes.

17. An apparatus for machining an electrically conductive part by electrical discharge comprising:
- at least two electrodes mounted in a base;
- a driver for positioning said base relative to said part:
- means for providing electrical energy to said electrodes to produce a plurality of electrical discharges between said electrodes and said part when said electrodes are positioned adjacent said part;
- an electrical discharge frequency monitor for measuring rises in the electrical discharge frequency of each of said electrodes, said discharge monitor also having the capability to measure the electrical discharge frequency of each of said electrodes; and
- a controller coupled to said driver and responsive to said discharge monitor for controlling said driver, said controller comprising a closed loop feedback control system including a microprocessor incorporating a closed loop feedback control algorithm for regulating the energy provided by said energy providing means in accordance with the electrical discharge frequency measured for each of said electrodes.

18. A device for controlling an electrical discharge machining (EDM) apparatus including a plurality of electrodes mounted in a base, said device comprising:
- an electrical discharge frequency monitor for measuring rises in the electrical discharge frequency of each of said electrodes; and
- a controller, responsive to said discharge monitor, for controlling at least the duration of machining by said EDM apparatus in accordance with the rises in electrical discharge frequency measured for each of said electrodes.

19. The device of claim 18, wherein said controller further comprises a sensor for monitoring the position of said base relative to an electrically conductive part.

20. A device for controlling an electrical discharge machining (EDM) apparatus including a plurality of electrodes mounted in a base, said device comprising:

an electrical discharge frequency monitor for measuring the electrical discharge frequency of each of said electrodes;

a voltage pulse generator for energizing said electrodes to produce a plurality of electrical discharges between said electrodes and said part when said electrodes are positioned adjacent said part; and a controller, responsive to said discharge monitor, for regulating the energy provided to said electrodes by said voltage pulse generator in accordance with the electrical discharge frequency measured for each of said electrodes.

21. The apparatus of claim 20, wherein said EDM apparatus further includes a driver for positioning said base relative to said part;

said controller being adapted to operate said driver in accordance with the electrical discharge frequency measured for each of said electrodes.

22. A method for machining an electrically conductive part with an electrical discharge apparatus comprising at least one electrode mounted in a base, said method comprising the steps of:

positioning said base relative to said part;

energizing said at least one electrode to produce a plurality of electrical discharges between said electrode and said part when said electrode is positioned adjacent said part;

measuring rises in the frequency of said electrical discharges; and controlling the position of said base in accordance with two successive rises above a predetermined value in electrical discharge frequency measured.

23. The method of claim 22, wherein the step of controlling the position of said base includes advancing said base towards said part.

24. The method of claim 22, wherein the step of controlling the position of said base includes retracting said base away from said part.

25. A method for machining an electrically conductive part with an electrical discharge apparatus comprising at least one electrode mounted in a base, said method comprising the steps of:

positioning said base relative to said part;

energizing said at least one electrode to produce a plurality of electrical discharges between said electrode and said part when said electrode is positioned adjacent said part;

measuring rises in the frequency of said electrical discharges; and controlling the electrical energy provided to said at least one electrode in accordance with the rises in electrical discharge frequency measured.

26. The method of claim 25, wherein said electrical discharge apparatus further comprises at least one other electrode mounted in said base, and wherein said method further comprises the steps of:

energizing said other electrode to produce electrical discharges between said other electrode and said part;

measuring rises in the electrical discharge frequency of said other electrode; and controlling the electrical energy provided to said electrodes in accordance with the rises in electrical discharge frequency measured for said other electrode.

27. The method of claim 26, wherein said electrodes have an electrode position offset, the step of controlling the electrical energy provided to said electrodes including measuring said electrode position offset.

28. The method of claim 26, wherein the step of controlling the electrical energy provided to said electrodes includes monitoring the position of said base.

29. A method for machining an electrically conductive part with an electrical discharge apparatus comprising at least two electrodes mounted in a base, said method comprising the steps of:

positioning said base relative to said part;

energizing said electrodes to produce a plurality of electrical discharges between said electrodes and said part when said electrodes are positioned adjacent said part;

measuring rises in the electrical discharge frequency of said electrodes; and controlling the position of said base in accordance with the rises in electrical discharge frequency measured for said electrodes.

30. The method of claim 29, wherein said electrodes have an electrode position offset, the step of controlling the position of said base including measuring said electrode position offset.

31. The method of claim 29, wherein the step of controlling the position of said base includes monitoring the position of said base.

32. A method for machining an electrically conductive part within an electrical discharge apparatus comprising at least one electrode mounted in a base, said method comprising the step of advancing the base towards said part at a predetermined rate;

energizing said at least one electrode to produce a plurality of electrical discharges between said electrode and said part when said electrode is positioned adjacent said part;

measuring the frequency of said electrical discharges; and regulating the electrical energy provided to said at least one electrode in accordance with the electrical discharge frequency measured.

33. The method of claim 32, wherein the step of energizing includes the step of providing a plurality of electrical energy pulses, each having a pulse width and an amplitude, and wherein the step of regulating the electrical energy provided includes the step of controlling the pulse width of said energy pulses.

34. The method of claim 32, wherein the step of energizing includes the step of providing a plurality of electrical energy pulses, each having a pulse width and an amplitude, and wherein the step of regulating the electrical energy provided includes the step of controlling the amplitude of said energy pulses.

35. An apparatus for machining an electrically conductive part by electrical discharge comprising:

at least one electrode mounted in a base;

a driver for positioning said base relative to said part;

means for providing electrical energy to said at least one electrode to produce a plurality of electrical discharges between said electrode and said part when said electrode is positioned adjacent said part;

an electrical discharge frequency monitor for measuring the frequency of said electrical discharges; and a controller, coupled to said energy providing means and responsive to said discharge monitor, for regulating the energy provided by said energy providing means in accordance with the electrical discharge frequency measured for said electrode.

36. The apparatus of claim 35, wherein said energy providing means is adapted to provide pulses of energy each having a pulse width and an amplitude, said controller having the capability to regulate the energy provided by said energy providing means by controlling the width of said pulses in accordance with the electrical discharge frequency measured for said electrode.

37. The apparatus of claim 35, wherein said energy providing means is adapted to provide pulses of energy, each having a pulse width and an amplitude, said controller having the capability to regulate the energy provided by said energy providing means by controlling the amplitude of said pulses in accordance with the electrical discharge frequency measured for said electrode.

38. A method for electrical discharge machining a conductive workpiece, said method comprising the steps of:
- initiating electrical discharges between an electrode and said workpiece;
- measuring frequency of said electrical discharges; and
- terminating said electrical discharges when the measured frequency of said electrical discharges rises above a predetermined value for a second time after said electrical discharges have been initiated.

* * * * *